United States Patent Office 3,752,707
Patented Aug. 14, 1973

3,752,707
CORROSION RESISTANT COMPOSITION AND METHOD
Isaac Laird Newell, Wethersfield, Conn., and William F. Houlihan, Springfield, Mass., assignors to Heatbath Corporation, Springfield, Mass.
No Drawing. Filed Aug. 23, 1971, Ser. No. 174,150
Int. Cl. C23f 7/26
U.S. Cl. 148—6.2                    22 Claims

ABSTRACT OF THE DISCLOSURE

Corrosion resistant compositions are disclosed which comprise an aqueous solution of a water-soluble hexavalent chromium compound, a water-soluble inorganic fluorine-containing compound and a soluble rare earth metal salt. The method of imparting a protective film to a metal surface using these compositions is also described.

BACKGROUND OF THE INVENTION

In the metal finishing industry, there is a continuing need for coatings used for paint bonding and corrosion resistance. This is especially true in the aluminum industry where aluminum and aluminum containing alloys require such coatings for normal protection.

Many such coatings have been suggested and used in the past, such as the phosphate, zincate and anodized films, but these have had drawbacks due to the long time required to produce the films, the complex and often difficult operating procedures, and the high cost of the completed films.

Chromate films have been found useful for corrosion protection and paint bonding of aluminum and many methods for producing these films have been developed. Newell et al., U.S. Pat. No. 2,844,496, covers a chromate film forming composition on aluminum containing sulfamic acid and Newell et al., U.S. Pat. No. 3,520,736 covers a chromate film forming composition containing nitroprusside. These patented compositions were developed not only to produce the desired corrosion resistance and paint adherence, but to also reduce the time required and cost of operation and thus make the film more economical.

However, even more improvement was desired, especially in the rate of film formation, ease of operation, and cost. This invention covers a new method of accelerating the formation of a paint bonding and corrosion resistant film on aluminum and aluminum containing alloys which eliminates many of the disadvantages of previous methods.

It is the object of this invention to provide a method which, in less than 60 seconds, produces a satisfactory corrosion resistant and paint bond coating on aluminum and aluminum alloys by spraying or roller coating. Rapid production of coatings is also possible by brushing or dipping procedures and such are within the purview of this invention.

It is also an object of this invention to produce the required coating by means of stable aqueous solutions requiring a minimum of control.

Further objects of this invention include an economical method utilizing low cost materials producing a relatively inexpensive film; a non-complex solution having a wide pH range and variable composition making for ease of operation; and the production of a highly effective colored film wherein the depth of color is related to the weight.

SUMMARY OF THE INVENTION

Accordingly, this invention, in its broadest aspect, relates to compositions capable of rapidly producing a protective film on metals and metal alloys which comprises an aqueous solution of a water-soluble chromium compound in which the chromium is in hexavalent form, a water-soluble inorganic fluorine-containing compound and a soluble rare earth metal salt.

One embodiment of the above described compositions concerns the amount of each component. The following amounts of each on a grams per liter bases of total aqueous solution is preferred:

(a) Water-soluble chromium compound: 0.5–10.0 g./l.
(b) Water-soluble inorganic fluorine: 0.1–13.0 g./l.
(c) Rare earth metal salt: 50 mgs. to 5.0 gm./l.

In the amounts just shown, the ensuing compositions are highly preferred embodiments of this invention:

| A | B | C | D | E | F |
|---|---|---|---|---|---|
| $CrO_3$ | $CrO_3$ | $CrO_3$ | $CrO_3$ | $CrO_3$ | $CrO_3$ |
| HF | HF | HF | HF | HF | $HBF_4$ |
| $Ce(NO_3)_3$ | $Th(NO_3)_4$ | $Sm(NO_3)_3$ | $Pr(NO_3)_3$ | $Nd(NO_3)_3$ | $Ce(NO_3)_3$ |

Another highly desirable aspect of this invention deals with the inclusion of a water-soluble nitrate such as nitric acid, sodium, potassium and/or ferric nitrate in the novel aqueous compositions disclosed herein.

Another aspect of this invention relates to the method of imparting a visible protective film to a metal surface, preferably an aluminum or aluminum-containing alloy, by contacting said surface with the compositions described herein.

DETAILED DESCRIPTION OF THE INVENTION

The compositions of this invention are employed in aqueous medium and are substantially compatible with treating equipment and methods already in use. In essence, the compositions of this invention comprise (a) a chromium compound, (b) a fluorine-containing compound, and (c) a soluble rare earth metal salt.

The rare earth metal salt component is the constituent that appears to be primarily responsible for the superior effects obtained by means of this invention. Compositions containing chromium compounds or compositions containing chromium compounds plus fluorine-containing compounds have been known for many years. Ferricyanide-fluoride compounds have been tried, with and without chromium compounds, but this combination leads to varying colorations and coating thicknesses with relatively small changes, sometimes inadvertent, in ingredient concentrations. The incorporation of rare earth metal salts accelerates the film formation to such an extent that a visible coating is produced usually within seconds. Moreover, the action of these accelerators is so great that only minor amounts are necessary.

The rare earth metal salts used herein should be water soluble. Generally, solubility will be at least about one gram per liter of water. The more soluble the rare earth metal salt, the more effective the results.

Representative of the rare earth metals are cerium, ytterbium, praseodymium, neodymium, promethium (sometimes known as illinium), samarium, europium, gadolinium, terbium, dysprosium, holmium, erbium, thulium, lutecium and also closely related elements and thorium.

The rare earth metal salts employed can either be the salt of a single rare earth metal or mixtures of rare earth metals, such as rare earth chlorides, didymium chlorides or Misch metal carbonates. Rare earth chloride solutions are commercially available.

The anionic portion of the rare earth metal salt is not critical so long as the resulting compound is soluble in the chromate bath. Hence, the anionic portion can be of the inorganic type such as chloride, fluoride, nitrate, etc. or of the organic type such as acetate, propionate, etc.

The amount of rare earth metal salt added to the herein disclosed aqueous compositions can range from 50 mgs. to 5.0 grams per liter and more preferred, is a range from 50 mgs. to 3 g./l.

The chromium compound should be soluble in the amount employed in the composition. Preferably, the water solubility of the chromium compound should be at least about 50 grams per liter. The chromium in the chromium compound should be in the hexavalent state. Chromium trioxide ($CrO_3$) is a useful and preferred chromium compound. Chromium trioxide is also referred to in the art as either chromic acid or chromic anhydride, there being some question as to whether in aqueous solution the initial chromium trioxide reacts with water to form the compound that might be referred to as hydrogen chromate or chromic acid, or whether chromium trioxide exists in solution as such. As used in this application and in the claims appended hereto, the term "chromium trioxide" is intended to refer both to solid chromium trioxide and to the compound formed when chromium trioxide is dissolved in water. Other water soluble sources of hexavalent chromium can be employed instead. For example, alkali metal chromates such as sodium chromate and potassium chromate can be employed. Other chromates meeting the solubility requirements can also be employed. Where desired, dichromates such as alkali metal dichromates can be used as the chromium compound or as an auxiliary chromium compound in admixture with chromium trioxide or a water soluble chromate.

The chromium compound is added in an amount to provide from 0.5 to 10 grams per liter of the aqueous solutions disclosed herein. Even more preferred is the range from 0.75 to 2.0 g./l.

The third component of the compositions of this invention is an inorganic fluorine-containing compound. The precise identity of the inorganic fluorine-containing compound is not critical; although it must be at least sparingly soluble in water and at least partially ionizable. Compounds used in this invention to supply a source of fluorine should be soluble at least to the extent of about 0.1 gram per liter of water. Representative fluorine-containing compounds, capable of use in this invention, include hydrogen fluoride, salts of hydrogen fluoride such as the alkali metal salts, e.g. sodium fluoride and potassium fluoride, the fluosilicates (otherwise known as silicofluorides), such as sodium fluosilicate and potassium fluosilicate. Fluosilicic acid can also be employed if desired; although it is difficult to handle. Other fluorine compounds useful in the invention include bifluorides, for example, sodium bifluoride, $NaHF_2$, fluoboric acid and the various salts of fluoboric acid, e.g. sodium fluoborate and potassium fluoborate, fluotitanates, fluozirconates, and other complex fluorides.

In the aqueous coating solution, the inorganic fluorine-containing compounds should be present in sufficient amount to provide from 0.1 to 13.0 grams per liter of aqueous solution. Even more preferred is the range from 0.5 to 7.5 g./l.

Other additives can be employed in the practice of this invention to enhance the effectiveness of the inventive compositions. For example, improved results appear to be obtained when there is an inorganic nitrate present in the solution. The inorganic nitrate can be nitric acid itself or a water soluble nitrate whose cationic portion does not have an adverse effect on the other constituents of the compositions and processes. Representative inorganic nitrates include sodium nitrate, potassium nitrate and ferric nitrate. The quantity of nitrate component can vary from 0 to about 10 grams per liter calculated on the weight of the nitrate radical. In some instances, the use of nitrate such as ferric nitrate is desirable for added coloration.

The pH of the aqueous solution is from about 0.7 to 2.5, preferably in the range from 1 to 1.5. Adjustment of pH can be made where necessary with suitable acids such as nitric acid, The use of reducing acids, such as sulfurous acid is best avoided since it appears to have a deleterious effect.

Where alkaline adjustment is required, a suitable alkali metal hydroxide or carbonate such as sodium hydroxide or potassium hydroxide can be employed.

A convenient method of marketing the compositions of this invention is to package the source of chromium, the source of fluorine and the rare earth metal salt compound all together in solid form in substantially anhydrous conditions with the ultimate user adding the water. Alternatively, the components can be marketed as an aqueous concentrate of chromium trioxide and the rare earth metal salt, with the user adding the more sparingly soluble fluorine-containing compound and additional water to make up the requisite concentration.

In use, the compositions of this invention are particularly adapted for application to an aluminum or aluminum alloy (at least 80% aluminum) surface. Good results are also achieved upon application to other metals with which the compositions are compatible using standard handling and process techniques. Representative other metals include zinc, magnesium and cadmium. All that is necessary is to insure adequate contact between the aqueous composition and the metal surface being protected. A contact time from 5 seconds upward can be employed, dependent upon the thickness of coating desired. Contact times of 10 seconds yield coatings having commercially desirable properties in all respects. Longer contact times can be employed to build up thicker coatings where subsequent finishing operations require, for one reason or another, a thicker coating. The compositions of the invention can be applied by spraying, brushing, immersing, dipping, roller coating, painting or any other suitable means. The temperature of application can preferably be within the range from about 60° F. to 150° F.

Example I

A one (1) liter aqueous solution was prepared containing the following amounts of ingredients expressed in grams per liter (g./l.):

| Component: | Grams/liter |
|---|---|
| Chromic acid | 1.58 |
| Hydrofluoric acid (50%) | 1.21 |
| Cerium nitrate hexahydrate | 0.26 |

This bath having a pH of 2.0 was heated to a temperature of 100° F. and a sheet of 3003 aluminum was sprayed for 15 seconds at a nozzle pressure of 18 p.s.i., followed by a rinsing in cold water. A visible, light gold colored coating was formed which was found to be tightly adherent, abrasive resistant and a weight of 10 milligrams per square foot.

Example II

Similar 1 liter coating bath solutions were prepared containing the following:

| (A) Component: | Grams/liter |
|---|---|
| Chromic acid | 1.58 |
| Fluoboric acid (49%) | 5.26 |
| Cerium nitrate | 0.53 |
| (B) Component: | |
| Chromic acid | 1.58 |
| Fluoboric acid (49%) | 5.26 |
| Cerium nitrate | 3.0 |

Bath A has a pH of 1.55 and B a pH of 1.50. Aluminum panels were sprayed with both solutions at 18 p.s.i. at a temperature of 100° F. for 60 seconds. With Bath A, the coating was light iridescent yellow. With Bath B, the coating was a dark yellow.

Example III

A 1 liter aqueous bath was prepared having the following composition:

| Component: | Grams/liter |
|---|---|
| Chromic acid | 5.0 |
| Hydrofluoric acid | 2.4 |
| Samarium nitrate | 2.0 |
| Nitric acid | 2.84 |

An aluminum panel was effectively treated by immersion into this bath (pH of 1.30) for 3 minutes at 70° F. An adherent, abrasive resistant, yellow coating was produced having a weight of 7.2 mg./sq. ft.

Example IV

A 1 liter aqueous bath was prepared having the following composition:

| Component: | Grams/liter |
|---|---|
| Chromic acid | 5.0 |
| Hydrofluoric acid | 2.4 |
| Praseodymium nitrate | 4.0 |
| Nitric acid | 2.84 |

An aluminum panel was dipped for 7 minutes at 100° F. into this bath (pH 1.25). An adherent, abrasive resistant, yellow film was produced having a coating weight of 21.3 mg./sq. ft.

Example V

A 1 liter aqueous bath was prepared having the following composition:

| Component: | Grams/liter |
|---|---|
| Chromic acid | 5.0 |
| Hydrofluoric acid | 2.4 |
| Neodymium nitrate | 2.0 |
| Nitric acid | 2.84 |

An aluminum panel was immersed in this bath (pH 1.40) for 3 minutes at 80° F. The coating produced was yellow in color with a weight of 28.0 mg./sq. ft.

Examples VI–XVII

The following additional 1 liter aqueous compositions were found to yield satisfactory corrosion protection to aluminum samples:

| | VI | VII | VIII |
|---|---|---|---|
| Chromic acid | 1.58 g./l. | 1.58 g./l. | 1.58 g./l. |
| Sodium dichromate | | | |
| Hydrofluoric acid (50%) | | | |
| Fluoboric acid (48%) | 4.0 g./l. | 5.26 g./l. | 5.26 g./l. |
| Hydrofluosilicic acid (30%) | | | |
| Ammonium hexafluorotitanate | | | |
| Cerium nitrate | 0.53 g./l. | 1.31 g./l. | 2.10 g./l. |
| Samarium nitrate | | | |
| Praseodymium nitrate | | | |
| Neodymium nitrate | | | |
| Misch metal carbonate | | | |
| Nitric acid | | | |
| pH | 1.45 | 1.5 | 1.25 |
| Temp., °F. | 100 | 100 | 100 |
| Time of spray or dip (seconds) | 60 | 60 | 60 |
| Pressure, p.s.i. | 18 | 18 | 18 |
| Color | Light irid. pink | Light yellow | Light yellow |

| | IX | X | XI |
|---|---|---|---|
| Chromic acid | 1.58 g./l. | 1.58 g./l. | 1.58 g./l. |
| Sodium dichromate | | | |
| Hydrofluoric acid (50%) | | | |
| Fluoboric acid (48%) | 5.26 g./l. | 5.26 g./l. | 4.0 g./l. |
| Hydrofluosilicic acid (30%) | | | |
| Ammonium hexafluorotitanate | | | |
| Cerium nitrate | 3.0 g./l. | 5.0 g./l. | 2.0 g./l. |
| Samarium nitrate | | | |
| Praseodymium nitrate | | | |
| Neodymium nitrate | | | |
| Misch metal carbonate | | | |
| Nitric acid | | | |
| pH | 1.25 | 1.25 | 1.5 |
| Temp., °F. | 100 | 100 | 100 |
| Time of spray or dip (seconds) | 60 | 60 | 60 |
| Pressure, p.s.i. | 18 | 18 | 18 |
| Color | Dark yellow | Very light yellow | Very light yellow |

| | XII | XIII | XIV |
|---|---|---|---|
| Chromic acid | 1.58 g./l. | 1.58 g./l. | 1.58 g./l. |
| Sodium dichromate | | | |
| Hydrofluoric acid (50%) | | | |
| Fluoboric acid (48%) | 5.26 g./l. | 2.66 g./l. | 7.98 g./l. |
| Hydrofluosilicic acid (30%) | | | |
| Ammonium hexafluorotitanate | | | |
| Cerium nitrate | 2.0 g./l. | 0.79 g./l. | 0.79 g./l. |
| Samarium nitrate | | | |
| Praseodymium nitrate | | | |
| Neodymium nitrate | | | |
| Misch metal carbonate | | | |
| Nitric acid | | | |
| pH | 1.35 | 1.7 | 1.2 |
| Temp., °F. | 100 | 100 | 100 |
| Time of spray or dip (seconds) | 60 | 60 | 60 |
| Pressure, p.s.i. | 18 | 18 | 18 |
| Color | Light yellow | Very light yellow | Light yellow |

| | XV | XVI | XVII |
|---|---|---|---|
| Chromic acid | 5 g./l. | 5 g./l. | |
| Sodium dichromate | | | 5 g./l. |
| Hydrofluoric acid (50%) | | | 2.4 g./l. |
| Fluoboric acid (48%) | | | |
| Hydrofluosilicic acid (30%) | | | 3.5 g./l. |
| Ammonium hexafluorotitanate | 2.0 g./l. | | |
| Cerium nitrate | | | |
| Samarium nitrate | 2.0 g./l. | | |
| Praseodymium nitrate | | | |
| Neodymium nitrate | | | 2.0 g./l. |
| Misch metal carbonate | | 2.0 g./l. | |
| Nitric acid | 2.84 g./l. | | 2.84 g./l. |
| Sodium nitrate | | 3.0 g./l. | |

Examples XVIII–XIX

The following aqueous compositions (1 l.) were prepared and coated on the alloys indicated:

| | XVIII | XIX |
|---|---|---|
| Chromic acid | 1.58 g./l. | 1.58 g./l. |
| Sodium dichromate | | |
| Hydrofluoric acid (50%) | | 1.32 g./l. |
| Fluoboric acid (48%) | 3.3 g./l. | |
| Hydrofluosilicic acid (30%) | | |
| Ammonium hexafluorotitanate | | |
| Cerium nitrate | .53 g./l. | .53 g./l. |
| Samarium nitrate | | |
| Praseodymium nitrate | | |
| Neodymium nitrate | | |
| Misch metal carbonate | | |
| Nitric acid | 1.18 g./l. | .66 g./l. |
| Color: | | |
| Alloy 3003 | Light yellow | Dull yellow |
| Alloy 2024 | Yellow, faint irid. | Deep yellow |
| Alloy 6061 | Dull light yellow | Extremely thin, light yellow |
| Alloy 7075 | Yellow with faint irid. | Deep yellow |

The chemical composition of the aluminum alloys used in Examples XVIII and XIX is given herewith.

| | Si | Fe | Cu | Mg | Mo | Cr | Zn | Ti | Others |
|---|---|---|---|---|---|---|---|---|---|
| Alloy composition: | | | | | | | | | |
| 7075 | 0.5 | 0.7 | 1.2–2.0 | 0.3 | 2.1–2.9 | 0.18–0.4 | 5.1–6.1 | 0.2 | 0.15 |
| 6061 | 0.4–0.8 | 0.7 | 0.15–0.4 | 0.15 | 0.8–1.2 | 0.15–0.35 | 0.25 | 0.15 | 0.15 |
| 3003 | 0.6 | 0.7 | 0.2 | 1.0–1.5 | | | 0.1 | | 0.15 |
| 2024 | 0.5 | 0.5 | 3.8–4.9 | 0.3–0.9 | 1.2–1.8 | 0.1 | 0.25 | 0.15 | 0.15 |

Tests were carried out at 100° F., 18 p.s.i. spray pressure and at 60 seconds time.

Examples XX–XXII

The following aqueous compositions (1 l.) were prepared and coated on aluminum panels:

|  | XX | XXI | XXII |
|---|---|---|---|
| Chromic acid | 1.58 g./l. | 1.58 g./l. | 1.58 g./l. |
| Fluoboric acid (50%) | 5.26 g./l. | 5.26 g./l. | 5.26 g./l. |
| Cerium nitrate | 0.0017 g./l. |  | 2.00 g./l. |
| Thorium nitrate |  | 0.0017 g./l. |  |
| pH | 1.6 | 1.55 | 1.65. |
| Temperature, °F | 110 | 100 | 110. |
| Color: |  |  |  |
| 10 seconds | Light yellow | Light yellow | Light yellow |
| 60 seconds | Yellow | Reddish yellow | Do. |

Example XXIII

The following composition was prepared and was used to coat a panel of 2024 aluminum alloy:

|  | G. |
|---|---|
| Chromic acid | 1.58 |
| Cerium nitrate | .53 |
| Nitric acid 42° Bé. | .66 |
| Hydrofluoric acid (50%) | 1.32 |
| Water to 1000.0 ml. | |

The panel was coated by spraying for 60 seconds at 100° F. at a pressure of 18 p.s.i. After drying the panel was tested for corrosion resistance in a salt fog test as described in MIL-STD-810B, dated June 15, 1967, Method 509 which is hereby incorporated by reference. The test utilizes a 5% aqueous sodium chloride solution which is atomized in a chamber in which the test panel is placed. In this test the specific gravity of the salt solution was 1.04, the temperature was 95° F., the pH was 6.9 and the fog collected (mls./hr.) was 0.8. After 336 hours of exposure the panel was free of corrosion. This is sufficient to qualify as a corrosion resistant film in accordance with MIL–C–81706 dated June 30, 1970, which is hereby incorporated by reference.

What is claimed is:

1. A composition for the production of a corrosion resistant protective film on a metal surface which comprises an aqueous solution of from 0.5 to 10.0 grams per liter of a water-soluble chromium compound in which the chromium is in hexavalent form, from 0.1 to 13.0 grams of a water-soluble inorganic fluorine-containing compound and from 50 mg. to 5.0 grams of a soluble rare earth metal salt.

2. A composition as claimed in claim 1 wherein said water-soluble chromium compound is selected from the group consisting of chromium trioxide, alkali metal chromates and alkali metal dichromates present in an amount to provide from 0.5 to 10.0 grams per liter of said aqueous solution.

3. A composition as claimed in claim 2 wherein said chromium compound is chromium trioxide.

4. A composition as claimed in claim 1 wherein said fluorine-containing compound present in an amount to provide from 0.1 to 13.0 grams per liter of said aqueous solution is selected from the group consisting of hydrogen fluoride, alkali metal fluorides, fluosilicic acid and alkali metal salts thereof, fluotitanic acid and alkali metal salts thereof, fluoboric acid and alkali metal salts thereof, fluozirconic acid and alkali metal salts thereof, alkali metal bifluorides and mixtures thereof.

5. A composition as claimed in claim 4 wherein said fluorine-containing compound is hydrofluoric acid.

6. A composition as claimed in claim 4 wherein said fluorine-containing compound is fluoboric acid.

7. A composition for the production of a corrosion resistant protective film on a metal surface which consists essentially of an aqueous solution of from 0.5 to 10.0 grams per liter of a water-soluble chromium compound in which the chromium is in hexavalent form, from 0.1 to 13.0 grams of a water-soluble inorganic fluorine-containing compound and from 50 mg. to 5.0 grams of a soluble rare earth metal salt.

8. A composition as claimed in claim 1 wherein said rare earth salt is cerium nitrate.

9. A composition as claimed in claim 1 wherein said rare earth salt is thorium nitrate.

10. A composition as claimed in claim 1 wherein said rare earth salt is samarium nitrate.

11. A composition as claimed in claim 1 wherein said rare earth salt is praseodymium nitrate.

12. A composition as claimed in claim 1 wherein said rare earth salt is neodymium nitrate.

13. A composition as claimed in claim 1 also containing a water-soluble inorganic nitrate.

14. A composition as claimed in claim 13 wherein said inorganic nitrate is selected from the group consisting of nitric acid, sodium nitrate, potassium nitrate and ferric nitrate.

15. A method of imparting a visible protective film to a metal surface comprising contacting the metal surface with the composition of claim 1 for a period of time and at a temperature sufficient to cause the formation of a visible protective film.

16. A method as claimed in claim 15 wherein the metal surface is aluminum or an aluminum-containing alloy.

17. A method as claimed in claim 15 wherein said composition also contains a water-soluble inorganic nitrate.

18. A method as claimed in claim 15 wherein the metal surface is zinc.

19. A method as claimed in claim 15 wherein the metal surface is magnesium.

20. A method as claimed in claim 15 wherein the metal surface is cadmium.

21. A corrosion resistant metal article which comprises a metal substrate coated with a corrosion resistant amount of the composition of claim 1.

22. The product produced by the process of claim 15.

References Cited
UNITED STATES PATENTS

| 2,512,493 | 6/1950 | Gide | 148—6.2 X |
| 2,605,217 | 7/1952 | Freud | 148—6.2 X |
| 2,698,266 | 12/1954 | Thirsk | 148—6.2 |
| 3,444,007 | 5/1969 | Maurer et al. | 148—6.2 X |
| 3,493,441 | 2/1970 | Rausch et al. | 148—6.21 |

RALPH S. KENDALL, Primary Examiner

U.S. Cl. X.R.

148—31.5, 6.27